Dec. 13, 1938.    G. COLUCCI    2,139,880
PLYWOOD
Filed April 22, 1938    2 Sheets-Sheet 1
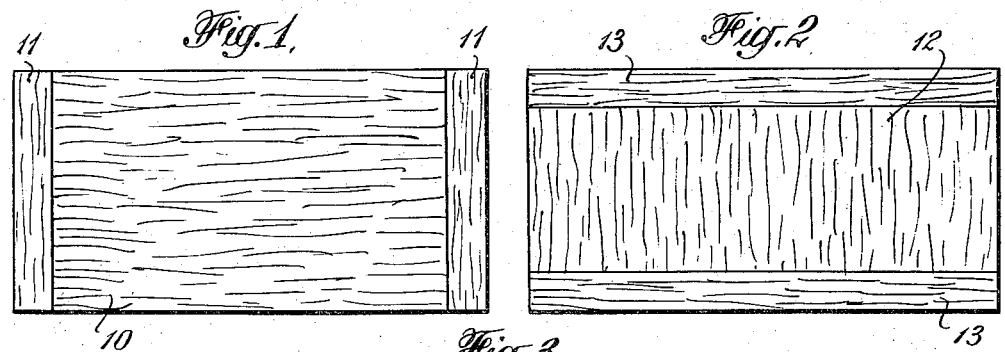
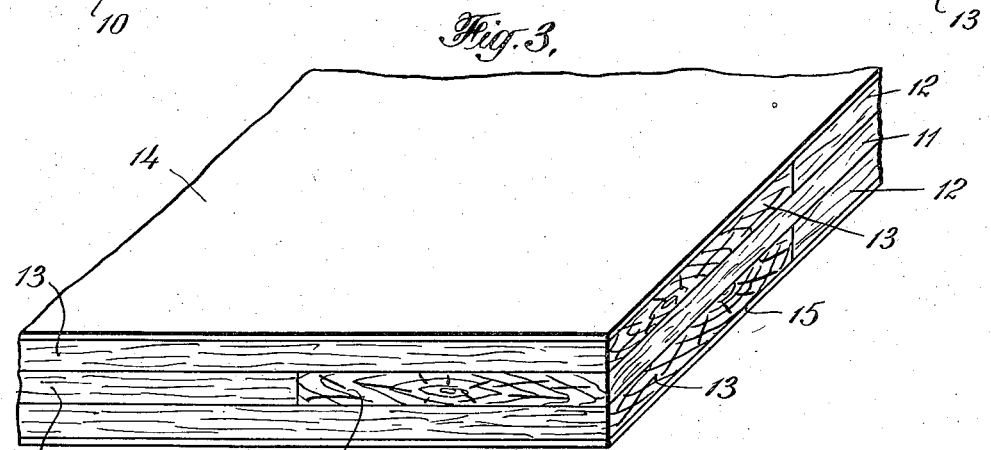
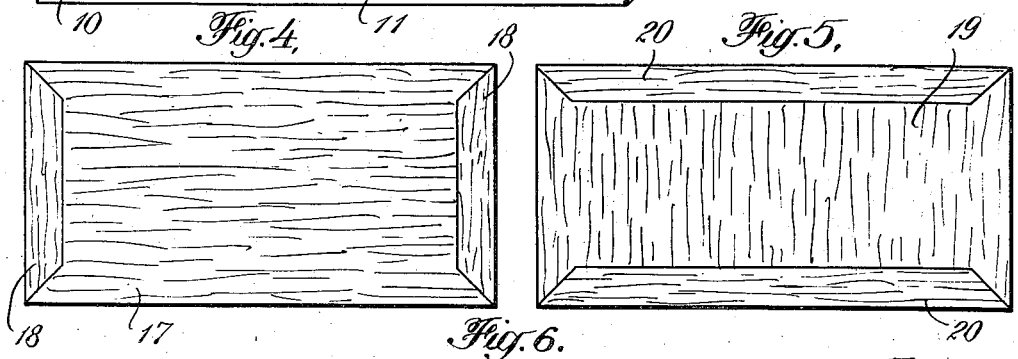
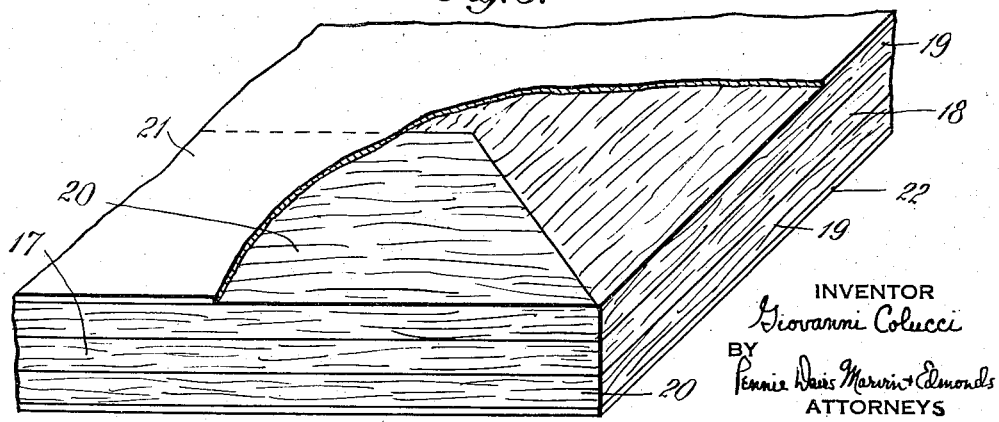
INVENTOR
Giovanni Colucci
BY Pennie Davis Marvin & Edmonds
ATTORNEYS Dec. 13, 1938.　　　　G. COLUCCI　　　　2,139,880
PLYWOOD
Filed April 22, 1938　　2 Sheets-Sheet 2
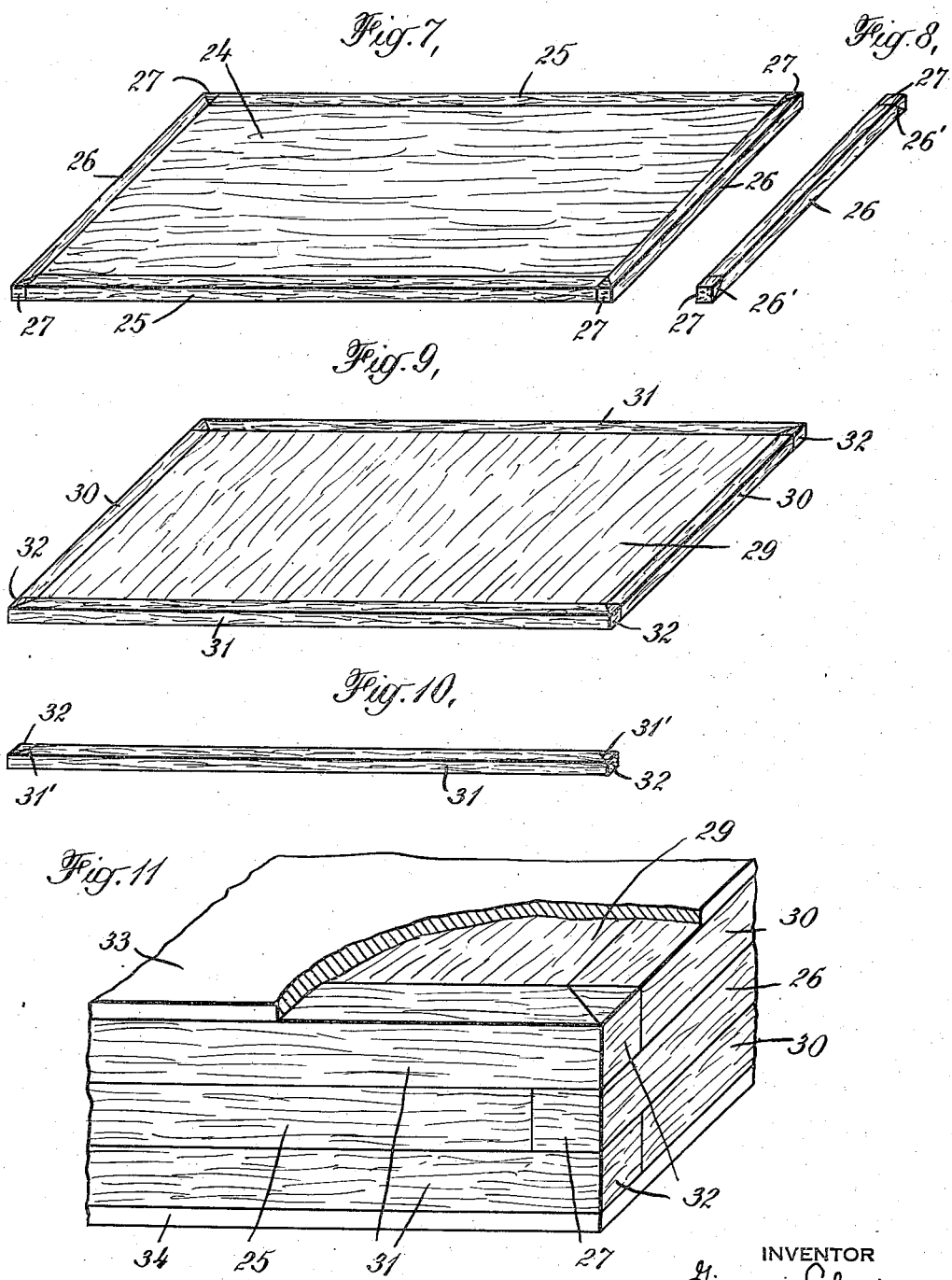
INVENTOR
Giovanni Colucci
BY
Pennie Davis Marvin & Edmonds
ATTORNEYS Patented Dec. 13, 1938

2,139,880

UNITED STATES PATENT OFFICE 2,139,880

PLYWOOD

Giovanni Colucci, Wilmington, N. C.

Application April 22, 1938, Serial No. 203,553

12 Claims. (Cl. 20—91)

This invention relates to laminated boards, such as plywood, and has particular reference to a novel laminated board which is highly resistant to twisting and warping, may be manufactured at low cost, and presents a more pleasing appearance than prior boards of this type.

Plywood, as generally made, includes two or more layers of wood glued together face to face to form a composite board. One form of plywood in common use is made up of several plies of rotary cut lumber, known as veneer, glued together with the fibres or grain of each ply extending transversely to the grain of the adjacent plies. This construction is objectionable for various reasons, the principal of which are that the end grain at the edges of each ply presents an unattractive appearance, and the board is easily twisted and warped.

A more desirable form of plywood made heretofore comprises a center lamination made up of narrow pieces of thick lumber glued together side by side with the grain of all the pieces extending in one direction, the pieces thus forming a relatively heavy board or core of the size of the desired plywood. A lamination of thin veneer, known as a cross band, is then glued to each face of the core with the grain of the veneer running transversely to the grain of the core. Thereafter, another ply is glued to the outer face of each cross band with the grain extending transversely to the grain of the cross band, the two outer plies forming a finished face and back, respectively. While this construction is more resistant to twisting and wraping than the first construction, it is more expensive to manufacture because of the lumber used in the heavy core. The manufacture of such lumber is attended by a considerable loss in slabs, sawdust and shavings, and accordingly the finished plywood is more costly than plywoods consisting only of veneer or rotary cut lumber. Also, the end grain of the core is exposed and impairs the appearance of the plywood.

The present invention, therefore, is directed to the provision of a novel laminated board made of wood or other fibrous material, in which substantially all of the end grain is concealed and which will not twist or warp when subjected to severe weather conditions. In addition, the new board may be made at a lower cost than plywood of the core type and with a substantial saving in lumber.

The new board comprises two or more plies, preferably of veneer, each having bands of the same material connected thereto over the end grain at opposite edges of the ply with the grain of the bands running parallel to the edges to which they are connected. The plies are glued or otherwise secured together face to face, with their edges coinciding, to form a composite board which may be used as finished plywood or may serve as a plywood core. Preferably, facing and backing layers of thin veneer are glued to the board to cover the edge bands and provide smooth, finished faces. With this construction, the edge bands serve not only to cover the end grain of the plies, but also to strengthen the board against twisting and warping. If desired, the edge bands may be connected to the plies by mitred joints so that even the end grain of the bands is concealed, whereby all of the edge grain is parallel to the respective edges. Since the plies, as well as the edge bands, may be made from veneer, the new plywood may be made with a smaller lumber waste than plywood of the type employing a heavy lumber core.

For a better understanding of the invention reference may be had to the accompanying drawings, in which Figs. 1 and 2 are plan views of two different laminations used in one form of the new plywood;

Fig. 3 is a perspective view of one corner of a plywood board including the laminations shown in Figs. 1 and 2;

Figs. 4 and 5 are plan views of two different laminations used in a modified form of the new plywood;

Fig. 6 is a perspective view of one corner of a plywood board including the laminations shown in Figs. 4 and 5, with part of the board broken away;

Fig. 7 is a perspective view of a lamination used in still another form of the new plywood;

Fig. 8 is a similar view of an edge band illustrated in Fig. 7, showing the band as it is cut prior to attachment to the ply;

Fig. 9 is a perspective view of another lamination adapted to be glued to one face of the lamination shown in Fig. 7;

Fig. 10 is a similar view of an edge band as it is cut prior to attachement to the ply of the lamination shown in Fig. 9, and Fig. 11 is a perspective view of a composite board including the laminations shown in Figs. 7 and 9.

The plywood shown in Figs. 1, 2 and 3 comprises a center lamination made up of a wood ply 10 in which the grain extends lengthwise of the ply, and a band 11 connected to each end edge of the ply over the end grain. Preferably, the bands 11 are of the same material as the ply and have their grains extending parallel to the respective edges to which the bands are secured. The bands are rectangular, as illustrated, and may be connected to the ply 10 by tape, glue, staples, etc.

Glued or otherwise secured to each face of the center lamination is another lamination made up of a wood ply 12 of a length equal to the combined length of the ply 10 and the width of each band 11. The ply 12 is somewhat narrower than the ply 10 and has its grain extending transversely to the grain of the latter ply. Connected to the side edges of the ply 12 are bands 13 which are of the same material as the ply and cover the end grain thereof, the grains of the bands 13 being parallel to the respective side edges of the ply to which the bands are connected. The combined width of the ply 12 and the width of each band 13 is equal to the width of ply 10, so that when the laminations 12—13 are secured to the opposite faces of layer 10—11, as shown in Fig. 3, the edges of the laminations coincide. While the composite board thus formed may be used as a finished plywood, I prefer to cover the faces thereof with facing and backing layers 14 and 15, respectively, made of thin veneer and secured to the board by glue.

It will be observed that in the new plywood all of the end grain of the plies 10 and 12 is covered by the edge bands 11 and 13, and the only end grain exposed in the finished board is that at the ends of the edge bands and at the ends of the facing and backing layers 14 and 15. However, since the latter layers are extremely thin and the ends of the edge bands form only a small part of the edges of the composite board, the amount of exposed end grain is relatively small. The facing and backing layers 14 and 15 give the faces of the board a finished appearance and add to the strength of the board, and also cover the edge bands 13. In addition to covering the end grain of the plies, the bands 11 and 13 strengthen the plies against twisting and warping and thereby render the board more resistant to deformation resulting from severe weather conditions. Preferably, the plies, edge bands and facing layers are made from rotary cut, sliced or thinly sawed veneer, whereby the lumber waste incident to manufacture of the board is small in relation to the waste involved in making plywood of the heavy core type.

The plywood shown in Figs. 4, 5 and 6 comprises a center lamination made up of a wood ply 17 of veneer in which the grain extends lengthwise of the ply. Mitred in the ends of the ply and suitably secured thereto are edge bands 18 which are made of the same material as the ply and cover all of the end grain thereof. The grains of the bands 18 extend parallel to the respective edges of the ply to which the bands are secured, and the ends of the bands are covered by the side portions of the ply, as shown in Fig. 4. On each face of the center lamination is another lamination made up of a veneer ply 19 of the same length and width as the ply 17 and having the grain thereof extending transversely to the grain of the first ply. At the sides of the ply 19 are edge bands 20 which are mitre-joined to the ply and cover the end grain thereof, the grains of the bands 20 extending parallel to the respective side edges of the ply 19. The laminations 19—20 are secured to opposite faces of the center lamination 17—18 by glue, or the like, with the edges of the laminations coinciding to form the composite board shown in Fig. 6. Preferably, the board has facing and backing layers 21 and 22, respectively, of thin veneer glued thereto so as to cover the edge bands 20. With this construction, all of the end grain of the plies 17 and 19 is covered by the bands 18 and 20, and even the end grain of the bands is concealed. Accordingly, all of the grain at each edge of the laminations 17—18 and 19—20 extends parallel to the edge.

When it is desired to conceal the end grain of the edge bands without fitting the bands into the sides and ends of the plies, the construction shown in Figs. 7 to 11, inclusive, may be employed. The plywood shown in Fig. 11 comprises a center lamination including a veneer ply 24 in which the grain extends lengthwise of the ply, and bands 25 secured to the side edges of the ply with the grain of the bands substantially parallel to the grain of the ply. The bands 25 are of the same length as the ply and are secured thereto with the ends of the bands flush with the ends of the ply. At each end of the ply 24, the grain is covered by an edge band made from a wood strip 26 (Fig. 8) of a length equal to the combined widths of the ply 24 and edge bands 25. The strips 26 are mitred at their ends at 26' to form wedge-shaped pieces 27 and are secured to the ply with the short faces of the strips coinciding with the end edges of the ply. The wedge-shaped pieces 27 are reversed and inserted between the mitred ends of strips 26 and the adjacent ends of edge bands 25, whereby the grains of the pieces 27 extend substantially parallel to the bands 25.

Secured to each face of the center lamination is another lamination comprising a veneer ply 29 in which the grain extends transversely to the grain of ply 24. Bands 30 are secured to the end edges of the ply with the grain of the bands extending substantially parallel to the grain of the ply. The end grain at each side edge of the ply 29 is covered by an edge band made from a wood strip 21 (Fig. 10) which is of a length equal to the combined length of ply 29 and width of edge bands 30. As shown in Fig. 10, the ends of each strip 31 are mitred at 31' to form wedge-shaped pieces 32. The strips 31 are secured to the ply with the short faces thereof coinciding with the side edges of the ply, and the wedge-shaped pieces 32 are inserted and secured between the mitred ends of the strips 31 and the adjacent ends of bands 30, with the grain of the pieces parallel to the grain of bands 30. The lamination shown in Fig. 9 is glued or otherwise secured to one face of the center lamination with the edges of the laminations coinciding, and a lamination similar to that shown in Fig. 9 is secured in the same manner to the opposite face of the center lamination. Preferably, the outer laminations are covered by facing and backing layers 33 and 34, respectively, made of thin veneer.

With the construction shown in Fig. 11, the end grain of the plies 24 and 29 is completely covered, and even the end grain of the edge bands is concealed. The fitting of the edge bands to the plies does not require cutting of the plies and may be performed rapidly without delicate fitting operations, since the wedge-shaped pieces 27 and 32 fit snugly against the mitred ends of the strips 26 and 30, respectively, from which they are cut.

I claim:
1. A laminated board comprising a plurality of layers of fibrous material, one layer including a ply having the fibres extending in one direction and having bands connected to opposite edges of the ply over the ends of the fibres, and each layer adjacent said first layer including a ply having the fibres extending substantially transversely to said fibres of the first ply and having bands connected to opposite edges thereof over the ends of the fibres, said layers being secured together face to face with the edges thereof substantially coinciding.

2. A laminated board comprising a plurality of layers of fibrous material, one layer including a ply having the fibres extending lengthwise thereof and having bands connected to the opposite ends over the ends of the fibres, and each layer adjacent said first layer including a ply having the fibres extending transversely to said fibres of the first ply and having bands connected to the sides thereof over the ends of the fibres, said layers being secured together face to face with the edges thereof substantially coinciding.

3. Plywood comprising a ply having the grain extending substantially lengthwise thereof, a band connected to the ply at each end to cover the end grain, said ply and bands forming a composite lamination, a second ply of a length equal substantially to the overall length of said lamination and having the grain extending transversely to the grain of the first ply, the second ply being narrower than the first ply, and a band connected to the second ply at each side to cover the end grain thereof, said second ply and bands forming a composite lamination of substantially the same dimensions as the first lamination, said laminations being secured together face to face with the edges thereof substantially coinciding.

4. Plywood comprising a ply having the grain extending substantially lengthwise thereof, a band connected to the ply at each end to cover the end grain, a second ply of a length equal substantially to the combined length of the first ply and the width of each band, the second ply being narrower than the first ply, and bands connected to the side edges of the second ply and covering the end grain thereof, the combined width of the second ply and the width of each of said second bands being substantially equal to the width of the first ply, said plys and the respective bands forming two laminations and the laminations being secured together face to face with their edges substantially coinciding.

5. A laminated board comprising a plurality of laminations of fibrous material, one lamination including a ply having the fibres extending in one direction and having bands connected to the ply over the ends of the fibres, and each lamination adjacent said first lamination including a ply having the fibres extending substantially transversely to said fibres of the first ply and having bands connected thereto over the ends of the fibres, said laminations being secured together face to face with the edges thereof substantially coinciding, and facing and backing layers covering the outer faces of said laminations and overlying said bands.

6. In a plywood board, a lamination including a ply of veneer having the grain extending in one direction, bands connected to opposite edges of the ply over the end grain thereof with the grain of the bands parallel to said edges, a second lamination secured to at least one face of the first lamination and including a ply of veneer having the grain extending transversely to said grain of the first ply, bands connected to opposite edges of the second ply over the end grain thereof, said second bands having the grain thereof substantially parallel to said edges of the second ply, the laminations being secured together face to face with the edges thereof coinciding, and facing and backing layers of veneer covering the outer faces of said laminations and overlying the bands thereof.

7. A board comprising a plurality of laminations of fibrous material, one lamination including a ply in which the fibres extend substantially lengthwise thereof and bands set into the ends of the ply to cover the ends of the fibres, the ends of the band being covered by the side portions of the ply, and each adjacent lamination including a ply in which the fibres extend substantially transversely of the fibres of the first ply, and bands set into the sides of the second ply to cover the ends of the fibres thereof, the ends of said last bands being covered by the end portions of the second ply, said laminations being secured together face to face with their edges substantially coinciding.

8. A board comprising a plurality of laminations of fibrous material, one lamination including a ply in which the fibres extend substantially lengthwise thereof and bands mitre-joined to the ends of the ply to cover the ends of the fibres, and each adjacent lamination including a ply of substantially the same length and width as the first ply and having the fibres thereof extending substantially transversely to the fibres of the first ply, and bands mitre-joined to the sides of the second ply to cover the ends of the fibres thereof, said laminations being secured together face to face with their edges substantially coinciding.

9. A board comprising a plurality of laminations of fibrous material, one lamination including a ply in which the fibres extend substantially lengthwise thereof and bands set into the ends of the ply to cover the ends of the fibres, the ends of the band being covered by the side portions of the ply, and each adjacent lamination including a ply in which the fibres extend substantially transversely of the fibres of the first ply, and bands set into the sides of the second ply to cover the ends of the fibres thereof, the ends of said last bands being covered by the end portions of the second ply, said laminations being secured together face to face with their edges substantially coinciding, and facing and backing layers covering the outer faces of said laminations and overlying said bands.

10. In a plywood board, the combination of a plurality of laminations, each comprising a veneer ply and bands of wood secured to the edges of the ply with the grain of the bands extending substantially parallel to the respective edges, said laminations being secured together face to face with the grain of each ply extending substantially transversely to the grain of each ply adjacent thereto and with the edges of the laminations coinciding.

11. A laminated board comprising a plurality of layers of fibrous material, each including a ply having bands secured to the end edges of the ply over the end grain thereof with the grain of the bands extending substantially parallel to said edges, each band including a strip mitered at each end over the entire end and having the mitered end portions reversed and secured to the strip with the grain of said end portions extending transversely of the strip to cover all of the end grain thereof, said layers being secured together face to face with their edges substantially coinciding and with the ply of each layer having its fibers extending substantially transversely of the fibers of the ply in each adjacent layer.

12. A laminated board comprising a plurality of layers of fibrous material, each including a ply having bands secured to the side edges of the ply and terminating at the ends thereof, and bands secured to the end edges of the ply, each end band being longer than the width of the ply and including a strip mitered at each end over its entire end and having the mitered end portions reversed and inserted between the mitered ends of the strip and the adjacent ends of said side bands to cover all of the end grain of the strip, said layers being secured together face to face with their edges substantially coinciding and with the ply of each layer having its fibers extending substantially transversely of the fibers of the ply in each adjacent layer.

GIOVANNI COLUCCI.